United States Patent [19]

Szabo et al.

[11] 4,166,377
[45] Sep. 4, 1979

[54] APPARATUS FOR MEASURING THE DAMPING COEFFICIENT OF TORSIONAL-VIBRATION DAMPERS

[75] Inventors: Imre Z. Szabó; Kornél Nagy; Csaba Finta, all of Győr, Hungary

[73] Assignee: Magyar Vagon- és Gépgyár, Győr, Hungary

[21] Appl. No.: 789,095

[22] Filed: Apr. 20, 1977

[30] Foreign Application Priority Data

Apr. 27, 1976 [HU] Hungary .............................. MA 2765

[51] Int. Cl.² .......................................... G01M 13/00
[52] U.S. Cl. ...................................................... 73/11
[58] Field of Search .................. 73/11, 12, 67.1, 67.2, 73/70.1, 517 A, 1 D

[56] References Cited

U.S. PATENT DOCUMENTS

| | | | |
|---|---|---|---|
| 1,891,613 | 12/1932 | Widney | 73/11 X |
| 3,105,381 | 10/1963 | Collette | 73/67.2 X |
| 3,955,400 | 5/1976 | Parker | 73/11 |

Primary Examiner—James J. Gill

[57] ABSTRACT

Measuring apparatus for quickly checking the damping coefficient of torsion-vibration dampers filled with a viscous liquid and being provided with a swing ring. The basic principle relates to the recognition that there is a well measurable, numerically characterizable relation between the damping coefficient of a damper of a given nominal geometry and the number of vibrations of the freely oscillating system. The apparatus comprises three main units, such as at least one torsional-vibrating system, at least one mechanism producing the free oscillation, and an electronic unit. Each unit is disclosed including optional as well as alternative detail solutions thereof.

9 Claims, 5 Drawing Figures

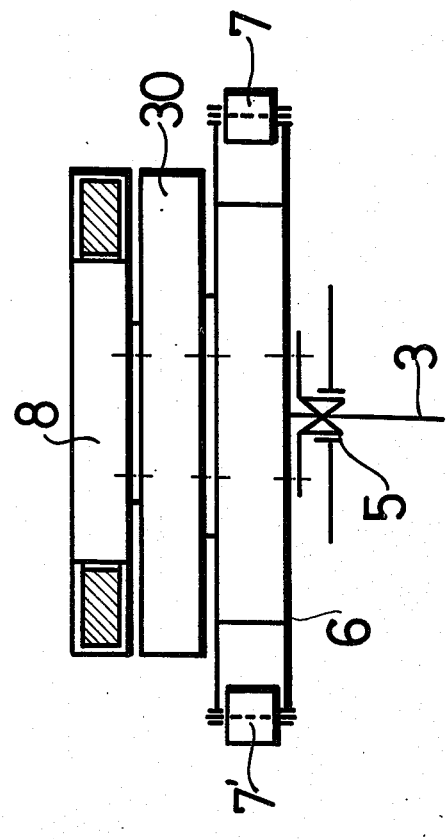

APPARATUS FOR MEASURING THE DAMPING COEFFICIENT OF TORSIONAL-VIBRATION DAMPERS

The invention relates to a measuring apparatus for the quick checking of the damping coefficient of torsional-vibration dampers filled up with a viscous liquid and provided with a swing ring.

As it is well known, such a torsional-vibration damper consists of a closed house, of the swing ring arranged in the house, while the gap between the house and the swing ring is filled up with the viscous liquid. The task of the vibration damper is to minimize i.e. to reduce to a permissible level the torsional-vibration amplitudes of the shaft, thus avoiding high-grade abrasion, noise and in extreme cases shaft fracture. As a consequence, in respect to useful life and endurance, faultless operation of the damper has been of utmost importance. The index charactierzing the reliability of the vibration dampers equals the damping coefficient of the damper.

Up to now neither a method nor an apparatus has been known by means of which reliable, quick and serial checking of the damping coefficient of such dampers was possible.

The most often applied testing method, considered as the most reliable for testing vibration dampers, is used in a system where it is intended to reduce an undesired amplitude of the vibration by the use of said damper, for instance in an internal combustion engine, for measuring the vibration in the presence of the vibration damper when built into the system. On the basis of the measured amplitude it can be stated whether the damping coefficient of the torsional-vibration damper of a given nominal geometry complies with the requirements.

Two damping coefficients, $\beta$min and $\beta$max, belong to the permissible maximal amplitude of vibration $\rho$ max. In case the damping coefficient lies between these two values, the amplitudes are smaller than the permitted value, consequently the damping coefficient and the operation of the damper can be considered satisfactory. This type of damper is characterized in that the damping coefficient, between the values $\beta$min and $\beta$max, shows an optimal value at which the amplitude of vibration reaches its minimum. Within a relatively wide range in the proximity of the optimal damping coefficient $\beta$opt, the variation of the damping coefficient does not involve a considerable increase of the amplitude.

As a consequence, the evaluation of the dampers is the more inaccurate, according to their damping coefficient, by means of measuring the vibration in such an original system, taking the amplitudes of vibration as a basis, the more that value approximates the optimum. In respect the endurance of the damper and from the point of view of construction and technology, it is not at all indifferent at which part of the interval—defined by $\beta$min and $\beta$max—the damping coefficient of the damper lies.

A further disadvantage of testing the damping coefficient of torsional-vibration dampers of the described type lies in that it is clumsy and expensive, the co-operation of experts is imperative, thus the method is unsuitable for the performance of serial tests.

Tendencies are known, that propose to perform the checking of these vibration dampers in a so-called substituting system, differing from the original one, e.g. in a system built up by means of cardan shafts. The common characteristics of these systems lie in that the house of the damper built into the system is forced to a vibration of a defined frequency and amplitude. In this case, due to warming up of the damper, the onset of the thermal balance has to be waited for, and as a consequence, the duration of the checking will not be considerably shorter, than with tests performed in the original system. At the same time the accuracy and reliability of the test worsen, and in most cases only rough estimations can be achieved.

The object set was to develop an apparatus by the aid of which quick and serial tests of torsional-vibration dampers become possible that are filled up with a viscous liquid and provided with a swing ring.

Furthermore it has been aimed to develop an apparatus to perform a measuring method with which an unambiguous and accurate relation can be established between the damping coefficient of the torsional-vibration dampers with a given nominal geometry and some easily measurable parameter of the same.

The main object of the invention is to build a measuring unit that is suitable for the quick realization of the measuring process, not requiring special knowledge, at which vibration dampers can be assembled and changed rapidly and without difficulty, rendering the measuring unit suitable for serial measurements.

It is of utmost importance that at one type of measuring the tested vibration damper can be qualified as "good" at a value which lies between the two limit values, i.e. good and bad, i.e. faulty vibration dampers can be differentiated without a definite evaluation, and in case of necessity comparable results can be obtained.

The invention is based on the recognition that within a torsional vibration system with one degree of freedom, consisting e.g. of a torsional shaft and a disc, there is a well measurable, accurate and umambiguous, numerically characterizable relation within the range of interest between the damping coefficient of a torsional vibration damper of a given nominal geometry and suitably mounted, e.g. fixed concentrically to the disc, and the number of vibrations of a freely oscillating system.

For this the explanation can be given that the characteristic curve of the number of vibrations plotted against the damping coefficient $\beta'$ shows a minimum at a value $\beta'$opt, i.e. the pertinent number of vibrations n opt represents the lowest possible number of vibrations to be measured in the system. At the effective damping value $\beta'$, when it is lower or higher than $\beta'$opt, the pertaining number of vibrations of the torsional-vibration damper will be higher than n opt.

To achieve a univocal result it is necessary to make a decision as to whether $\beta' < \beta'$opt, which means that the product tested is waste; when $\beta' > \beta'$opt, the product is to be considered faultless.

To settle the matter, another suitable control procedure can be used: a duration of vibration T ref, serving as a reference, is compared with the duration of the effective first vibration T of the system incorporating the torsional damper (as it will be described later in detail), and the quality of the damper is decided on the basis of a comparison.

For this purpose also another, however, more complicated procedure can also be used: the torsional damper in question is measured in another system, differing from the previous one only in the spring-stiffness of the torsional shaft. This is because in this case the characteristic curve "number of vibrations-damping coefficient" deviates from that of the first system, consequently an unambiguous decision can be made.

Summing up what has been said, the measuring method that can be performed with the apparatus according to the invention, serving for the quick testing of the damping coefficient of torsional-vibration dampers filled up with a viscous liquid and provided with a swing ring, is characterized in that the permissible extreme values $\beta'$min and $\beta'$max of the torsional vibration damping coefficient—between which the quality of the dampers is acceptable—are determined in a known way from the torsional vibration damper to be tested for a given nominal geometry. Furthermore a relation is established between the damping coefficients mentioned above, in the torsional vibration system provided with the torsional damper to be tested, having one degree of freedom and to be tuned by changing the vibrating mass or spring stiffness of the torsional shaft, and the number of vibrations (number of half-vibrations), n of the decay from a determined initial amplitude to a determined amplitude within the torsional vibration system having a free oscillation with damping.

After having built in the torsional vibration damper to be tested into the torsional vibration system, the latter is brought into a torsional vibrating state, always with an identical initial amplitude, hereafter free oscillation takes place. In accordance with the previously described definition, the number of vibrations (half-vibration) n is measured; hereafter—taking the number of vibrations (half-vibrations) between the permissible limit values $n_{min}$ and $n_{max}$ as a basis—a fair quality of the vibration damper is stated; if the values lie outside the limit values an inferior quality can be verified.

Determination of the damping coefficient can be performed in accordance with a method described in the chapter "Untuned Viscous Sheer Dampers" of the book of Nestorides: "A Handbook on Torsional Vibration" (BICERA- Cambridge 1958).

To determine lower or higher ratios in relation to the optimal damping coefficient, measurements can be performed in a further system, that differ from the first only in respect of the spring-stiffness of the torsional shaft (max. 0.5-fold, min. the double).

Determination of the lower or higher ratio in relation to the optimal damping coefficient can be performed in accordance with another procedure in such a way that, at the beginning of free oscillation with damping, the effective periodical time, or a quantity proportional to the same is compared to a time TB'opt, where TB'opt represents the periodical time of the dampers that show optimum damping within the system used for checking, or a quantity that is proportional to the same.

A preferred embodiment of the apparatus according to the invention preferably comprises a torsional vibration system having a torsional shaft fixed at one end and supported in bearings at the other, a disc fixed to the same, secured against turning-off a roller supported in bearings, on the rim of the disc, while the mechanism that produces oscillation and is provided with an energy supply source is connected to said roller. The apparatus furthermore comprises a sensing device arranged on the torsional shaft, and an electronic evaluation unit connected to the sensing device.

It can be considered as advantageous to provide the disc of the torsional vibration system with a hub, and the torsional shaft is then supported in bearings through said hub.

As a most suitable solution, a counter-weight of an appropriate mass, preferably a roller corresponding to the roller on the disc, is fixed on the discs, diagonally opposite the first-named roller. The mechanism producing free oscillation with damping is a cam disc, arranged eccentrically in relation to the roller of the disc fixed on the torsional shaft; the cam disc is arranged on the shaft and can be brought into contact with the roller as its initial position. When the shaft is turned the cam disc turns the roller and the disc simultaneously twisting the torsional shaft, and when the end of the cam disc overruns the roller, free oscillation with damping takes place in the entire torsional vibration system.

The free oscillation with damping can be achieved by arranging a clutch—for the unidirectional transmission of moment—on the shaft of the cam disc, to which the energy source is connected tht turns the shaft and the cam disc.

The electronic unit evaluating the process, serves for the determination of a quantity that is proportional to the number of total vibrations, preferably half-vibrations, and contains the earlier mentioned sensing device that produces a measuring signal proportional to the process. This is, for instance, a measuring bridge consisting of strain gauges and being fixed onto the torsional shaft.

The unit preferably also has an amplifier connected to the measuring bridge, a comparator for indicating that the measuring signal has surpassed a pre-determined minimal amplitude level, a counter for registering the unidirectinal surpasses of the levels, a device for indicating the number of surpasses and finally a control unit.

From the point of view of serial measurements it is recommended that if the electronic unit of the apparatus is made with a part yielding the reference time, incorporating a circuit for comparing the reference time with the effective periodical time, and a holding circuit. The result of comparison can be seen in the indicating device which is provided e.g., with red and green lamps. Comparison of the periodical time, combined with the indication of the number of surpasses, can be used for differentiating the good and inferior quality of the torsional-vibrating dampers, as a consequence, serial measurements and selections may be easily accomplished.

It is also recommended to provide the apparatus with two mechanical units for producing the free oscillation with damping, besides, the electronic unit. These units differ only in the spring stiffness of their torsional shafts.

It is also advantageous, if one or more separate discs are fixed to the disc of the torsional vibration system to promote tuning.

In a preferred embodiment of the apparatus, the energy source of the mechanism producing the free oscillation is formed by one or more parallel-connected air cylinders that are operated by means of an electropneumatic valve.

The advantage of the invention lies in that the checking of the damping coefficient and the operation of the torsional-vibration dampers, filled with a viscous liquid and provided with a swing ring, can be performed in a quick way which was not known up to now.

Taking into consideration that the damping coefficients of the dampers can be differentiated more accurately than ever before, the influence of the parameter affecting the magnitude of the damping coefficients can be checked too, thus optimalized construction and technology, as well as technical and economical advantages can be achieved.

Quick operation and reliability of the apparatus enable testing and surpervising the production of torsional-vibration dampers. By its application, the assembly of faulty produts can be prevented. By avoiding stresses resulting from detrimental vibrations, the useful life and reliability of valuable machines can be considerably increased.

When performing repairs, a further advantage appears when a positive information is given whether a vibration damper on an internal combustion engine to be repaired can be re-built or not.

A considerable advantage of the invention lies in that the characteristic curve (the maximum vibration amplitude plotted against the number of the vibrations) of the original system can be determined by means of relatively few measurements. As an consequence, measurements in the original system can be omitted since the maximal amplitude of vibration to be obtained in the original system, $\rho$ —preferably relating to the hormonic that yields the strongest exitation—can be achieved without difficulty on the basis of the numbers of vibrations.

Further details of the apparatus according to the invention will be described by reference to a preferred embodiment, on the basis of the accompanying drawings, wherein FIG. 1 shows a conventional characteristic curve—a coefficient $\beta$ versus an amplitude of vibration $\rho°$—determined by means of vibrations of identical nominal geometry at the resonance spot of the harmonic that yields the strongest excitation, in an internal combustion engine.

Figure 1:
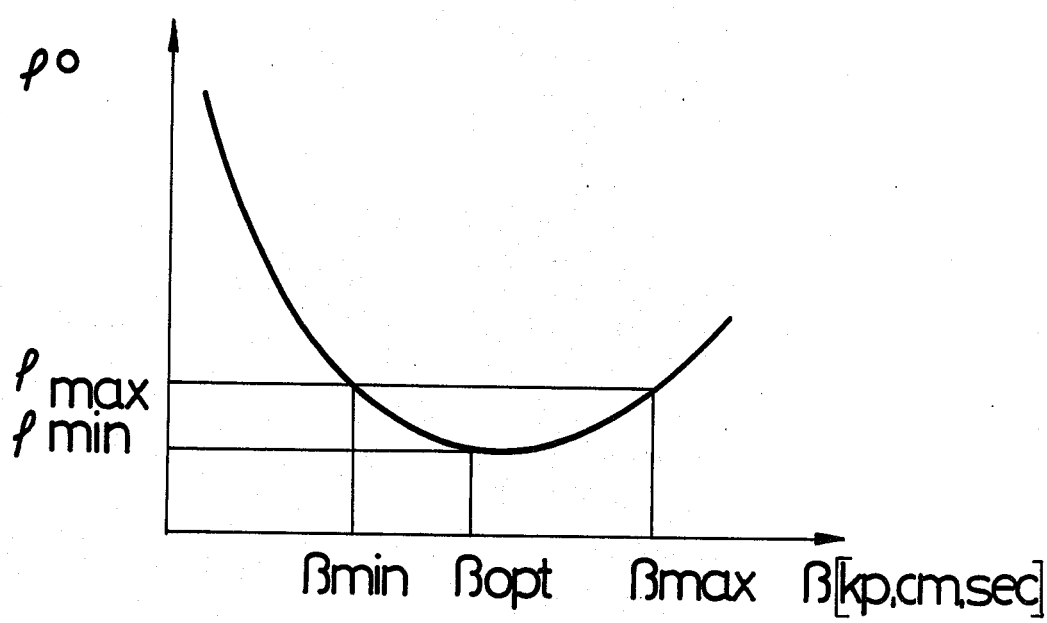

As it is seen in FIG. 1, a course of vibration amplitude of $\rho°$ is plotted in a known manner a damping coefficient $\beta$. A minimum amplitude value, $\rho_{min}$ is found at the damping coefficient $\beta$opt. To a permissible maximal amplitude of vibration, $\rho_{max}$ two damping coefficients belong, namely $\beta$min and $\beta$max. The damping coefficient and the operation of the vibration damper can be considered as complying with the requirements if the damping coefficient falls into an interval defined by the values $\beta$min and $\beta$max.

It can be seen in FIG. 1 that is is rather difficult to determine the position of the damping coefficient of a certain torsional-vibrating damper within the interval, by the available vibration-amplitude data, due to the inconsiderable change of the characteristic curve in the proximity of the optimum damping coefficient $\beta$opt. It should be noted that in practice the curve is flatter than illustrated in FIG. 1. Due to the complexity, slowness and incertainty of the measuring processes, this type of curve is inapt for serving as a basis for serial measurements.

Figure 2:
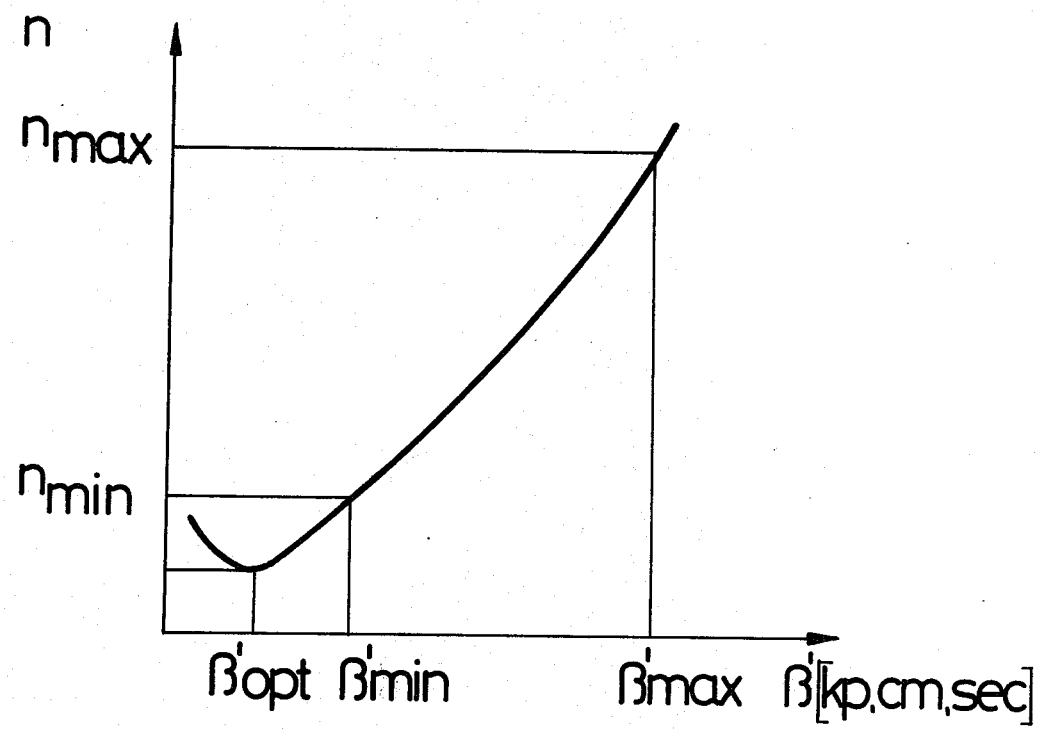
FIG. 2 shows a characteristic curve with a damping coefficient ↑ ' versus a number of vibrations of the apparatus according to the invention.

In FIG. 2 a characteristic curve "damping coefficient $\beta$'—number of vibrations n" of the apparatus according to the invention is plotted. If we indicate the values of the damping coefficients conforming to the permissible maximal and minimal coefficients $\beta$min and $\beta$max according to FIG. 1, or to values identical with $\beta$'min and $\beta$'max, it goes without saying that in case of faultless dampers the damping coefficients $\beta$' will fall into the interval. Nevertheless, as it is seen the diagram, a minimal value of the damping coefficient $\beta$'opt, related to the number of vibration n, is considerably different positioned in relation to $\beta$opt as illustrated in FIG. 1, i.e., it lies outside the interval defined by the damping coefficients $\beta$'min and $\beta$'max.

At the same time the relation between the damping coefficient $\beta$' and the number of vibrations in within the interval can be considered as practically linear. By taking the curve into consideration, and on the basis fo the number of vibrations determined, damping the coefficients $\beta$' of the vibration dampers can be differentiated unambigously and accurately according to the invention.

Preferably, tuning is performed in the system so that $\beta$'min $\geq 1.5$ $\beta$'opt exists between the optimal and the minimal damping coefficients $\beta$'opt and $\beta$'min. Naturally, minimal and maximal damping coefficients that define the interval can result from acceptable deviations in production or they may conform to the values $\beta$min and $\beta$max of FIG. 1. By the former circumstance the checking of production is promoted while in the second case an acceptable operation of the damper can be determined in a system e.g., in an internal combustion engine.

Figure 3:
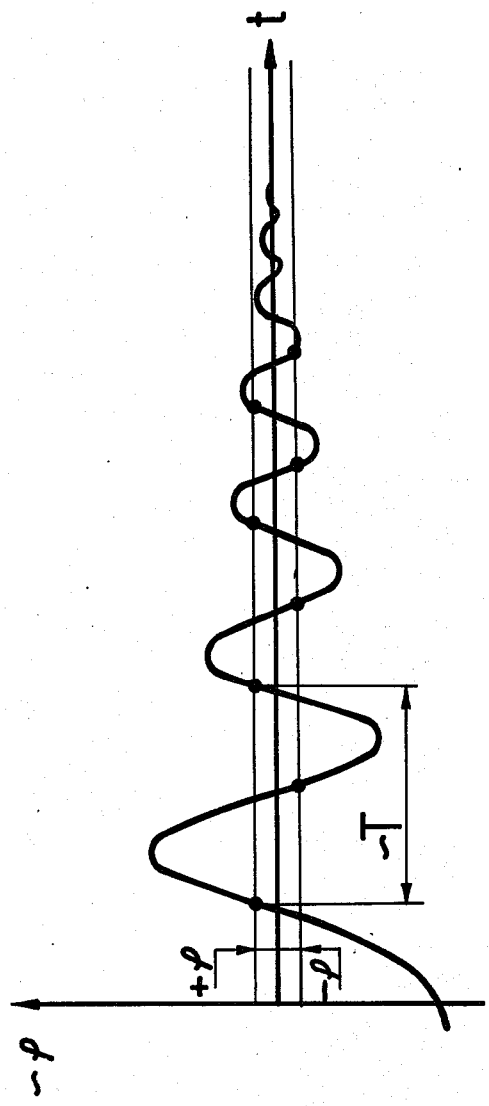
FIG. 3 is a diagram of the free oscillation process with damping, process plotted against time

In the diagram shown in FIG. 2, the number of vibrations or half-vibrations n is determined in such a manner that (as shown in FIG. 3 that relates to the process of free attenuation) the quantity proportional to the angular torsion $\rho°$ is plotted along one axis, while time t is plotted again the other axis. Lines $+\rho$ and $-\Delta$, symetricaly, drawn in the proximity of the time axis indicate the value at which the half-vibrations are counted, the amplitudes of which surpass the value or are identical with it. The number of half-vibrations thus obtained equals the number of points of intersection indicated in the figure. From the point of view of the inventive process, the time T indicated in FIG. 3 can be considered as a cycle time. In the example illustrated in FIG. 3 the number of half-vibrations amounts to eight.

Figure 4:
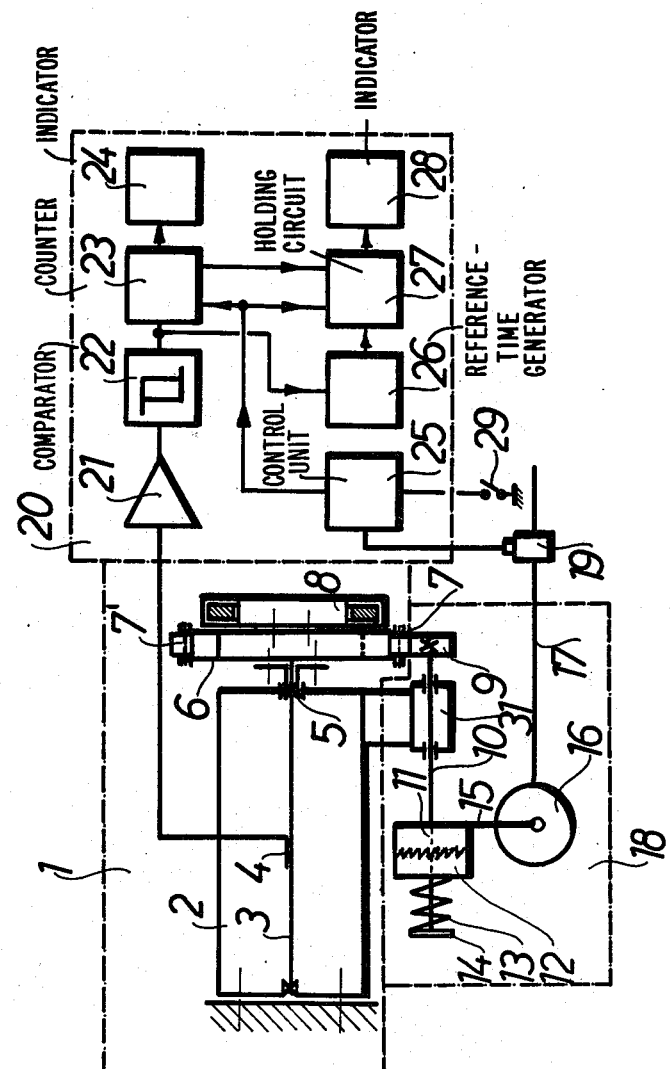
FIG. 4 shows a possible arrangement of a further disc serving for tuning the torsional vibration system.

In FIG. 4 a schematic representation of preferred, exemplary a apparatus according to the invention can be seen. Essentially, the apparatus consists of three interconnected main parts: A torsional vibration system 1, a mechanism 18 producing free oscillation with damping, and an electronic evailation unit 20.

The torsional vibrating system 1 incorporates a torsional shaft 3, one end of which is fixed to a supporting device 2, for instance by means of a screw connection not illustrated here, the other end being supported in bearings by preferably interposing a hub 5. The hub and a disc 6 are fixed onto the torsional shaft 3 in a non-turnable manner by means of a suitably dimensioned screw connection.

The vibration damper 8 to be tested can be fixed by means of a screwed connection to the disc 6. On the rim of this disc, a roller 7 is supported in bearings. Dismetrally opposite to that roller a body of identical mass, possibly another roller 7', is arranged as a counterweight; bearing support of the roller 7' is not imperative and stationary fixation is sufficient. An eccentric cam disc 9 fixed onto a shaft 10 of the mechanism 18 can be made to engage the roller 7. The shaft 10 is supported in bearings in a console 31 forming a part of the supporting device 2.

Discs. 11, 12 of the clutch are suitable for the unidirectional transmission of moment, and they and they are arranged on the shaft 10; frontal surfaces of the discs 11, 12 engage each other by means of a radial gearing. The disc 12 and the corresponding tracks of the shaft 10 are provided with ribs, partly for the transmission of the moment, and partly for axial guidance of that disc 12, while the disc 11 is arranged on the cam-disc shaft 10 that transverses the disc 11 in a turnable manner.

Discs 11, 12 are compressed by means of a spring 13 supported by a stationary disc 14. Disc 11 is connected to an air-cylinder 16 through an arm 15; into an air conduct 17 of the cylinder 16 an electropneumatical valve 19 is installed, the valve being connected to a control unit 25 of the electronic unit 20. A sensing device 4 of the electronic unit 20 —e.g. a bridge consisting of strain gauges — is arranged on the torsional shaft 3, while a terminal of the sensing device 4 is connected to an amplifier 21. A window comparator 22, built up of symmetrical comparators in a known way, indicates the surpass of an output signal of the amplifier 21 across the level indicated by the line $\pm\rho$ in FIG. 3, giving a pulse when the line $+\rho$ is crossed upwards, or the line $-\rho$ downwards. The task of a counter 23 is to count a standardized pulse series of the comparator 22. After decoding, the obtained number is shown by, e.g. with nixie-tubes.

When performing the selection of torsional dampers, it is of utmost importance that the electronic unit 20 contain suitable circuits being serviceable for comparing the period time T with the reference time T ref and for indicating the obtained result.

In the given cases two lamps, e.g. a green and a red one may be applied, indicating whether the damping coefficient $\beta'$ of a given torsional damper is greater or smaller than $\beta'$ opt. Before beginning the measuring process, one of the lamps burns.

If in the course of the following measuring process the period time T is longer than the adjusted reference time T ref, the holding circuit is triggered, the other lamp (the red one) is lit and stays so as long as results are being registered; thereafter the control unit restores the starting condition.

It, on the other hand, time T is shorter the periodic than the adjusted reference time T ref, triggering of the holding circuit does not take place and the (green) lamp lit before measuring does not go out (or change to the other, the red lamp).

For the determination and indication of ratios, the electronic unit 20 may contain a reference-time generator 26, a comparing and holding circuit 27, as well as an indicator 28. The generator 26, delivering a reference time $T\beta'$ opt, is connected to the window comparator 22 and the circuit 27 is connected to the counter 23. The indicator 28 indicates the ratios determined in the circuit 27, containing — as already mentioned — e.g. a green and a red respectively the faulty and the good quality of the lamp for respectively signalling the good and the faulty quality of the torsional vibration dampers.

When the process is finished, the red lamp burns and the damper is considered unambiguously faulty, according to the adjustment, if the damping coefficient is less than $\beta'$opt. When the green lamp burns, the damping coefficient is greater than $\beta'$opt; in this case the positive or negative quality of the damper should be determined on the basis of the number of vibrations. Part 29 of FIG. 4 will be described somewhat later.

In FIG. 5 a possible arrangement of a turning disc 30 is to be seen, serving for tuning the vibrating system, and fixed onto the disc 6 of the mechanical construction.

The apparatus according to the invention operates as follows:

The vibration damper 8 is mounted onto the disc 6. The eccentric cam disc 9 with the shaft 10 is turned to the roller 7, to its starting position, so that—at the beginning of the rotation—the disc 6 and the eccentric cam disc 9 contact each other. After pressing button 29, the electropneumatical valve 19 lets air stream into the cylinder 16, simultaneously the counter 23 is zeroed by the control unit 25. Through the power transmitting chain — consisting of the air cylinder 16, the arm 15, the discs 11, 12, the shaft 10, the eccentric cam disc 9 and the roller 7 — turning off of the disc 6 is initiated, simultaneously torsion of the shaft 3 takes place.

By that time the cam of the eccentric cam disc 9 slides along the rotating roller 7, and after having left the dead-centre position, the moment of the force transmitted to the shaft 10 from the roller 7 onto the eccentric cam disc 9 is reversed. As a consequence, the discs 11, 12 of the clutch, suitable for unidirectional transmission of the moment, overcome the pressure of the spring 13 and move in relation to each other. The eccentric cam disc 9 and the roller 7 are not in contact any more, the free oscillation of the system takes place with appropriate damping. The measuring signal, proportional to the process, arrives from the sensing device 4 through the amplifier 21 to the window comparator 22. When the measuring signal surpasses the levels indicated in FIG. 1, $\pm\rho$, the ground symmetrical comparators are triggered and gives a pulse at each single half-period. The series of pulses is counted and stored in the counter 23; the result appears in the indicator 28, yielding the number of half-vibrations that form the basis of the qualification.

In case if the control system contains two torsional vibration systems and two mechanisms for producing the free oscillation. as a modification, the individual units of the apparatus operate as described before.

In case if the electronic unit 20 contains the generator 26 for the evaluation of the period time, the circuit 27 and the indicator 28, said unit operates as follows: When the measuring signal passes for the first time the level $\mp\rho$ illustrated in FIG. 3, the pulse coming from the comparator 22 sets the reference-time generator 26 into action — that delivers the reference time $T\beta'$opt— the output signal arrives at the circuit 27. After the time T elapsed corresponding to the effective period time, a signal arrives from the counter 23 to the unit 27. In dependence of the relative timely sequence of arrival of the two signals, triggering of the holding circuit takes place, thus registering, whether the effective period time is shorter or longer than the reference time $T\beta'$ opt. By lighting the appropriate one of the lamps, as was described, the result is shown, in the indicator 28.

What we claim is:

1. An apparatus for quickly checking the damping coefficient of torsional-vibration dampers that are filled with a viscous liquid and are provided with a swing ring, comprising, in combination: at least one torsional vibration system (1); each having a torsional shaft (3) fixed (2) at one end and supported at the other end; a disc (6) fixed to said shaft and secured against turning; a roller (7) supported on a rim of said disc; at least one mechanism (18) for producing free oscillation with damping and being provided with a source (16) supplying energy, connected to said roller; said mechanism including a cam-disc shaft (10) connected to said roller; and a sensing element (4) arranged on said shaft and connected to an electronic evaluation unit (20), for sensing the oscillations of said shaft.

2. The apparatus as defined in claim 1, wherein said disc (6) has a hub (5); and said shaft (3) is supported at said other end by interposing said hub.

3. The apparatus as defined in claim 1, wherein said disc (6) being fixed to said torsional shat (3) through an eccentric cam disc (9); further comprising a clutch for unidirectional transmission of a moment, incorporating two clutch discs (11, 12); said energy source (16) being connected to one (11) of said clutch discs.

4. The apparatus as defined in claim 3, wherein said one clutch disc (11) is freely turnably supported on said cam-disc shaft (10); whereas the other clutch disc (12) is arranged on a guiding track formed on said cam-disc-shaft in a slidable manner and secured against turning; and wherein said clutch is provided with a spring (13) for pressing said clutch discs toward each other.

5. The apparatus as defined in claim 4, wherein said energy source is constituted by at least one mechanically actuated air cylinder (16) connected through an arm (15) to said one clutch discs (11).

6. The apparatus as defined in claim 1, wherein an input of said evaluation unit (20) is connected to said sensing element (4); and said unit is constituted by an amplifier (21), to the output of which a unit is connected that includes a counter (23), a decoder and indicator (24), this connection being through a window comparator (22), and a control unit (25) that forms part of said evaluation unit (20) and has an output which is connected to said counter 7. The apparatus as defined in claim 6, wherein said evaluation unit (20) includes a reference-time generator (26), a comparing and holding circuit (27), and an indicator (28) having series-connected signal lines; while an input of said generator is connected to an output of said comparator (22); and said comparing and holding circuit is connected to outputs of said counter (23) and of said control unit (25).

8. The apparatus as defined in claim 1, incorporating two of said torsional vibrating systems (1) and two of said mechanisms (18) for producing the free oscillation.

9. The apparatus as defined in claim 8, further comprising a disc (39) fixed in a non-turnable manner to said disc (6) of at least one of said torsional vibration system (1) for turning the latter.

* * * * *